(No Model.)
W. E. COLLINS.
VALVE FOR PNEUMATIC TIRES.
No. 573,392. Patented Dec. 15, 1896.
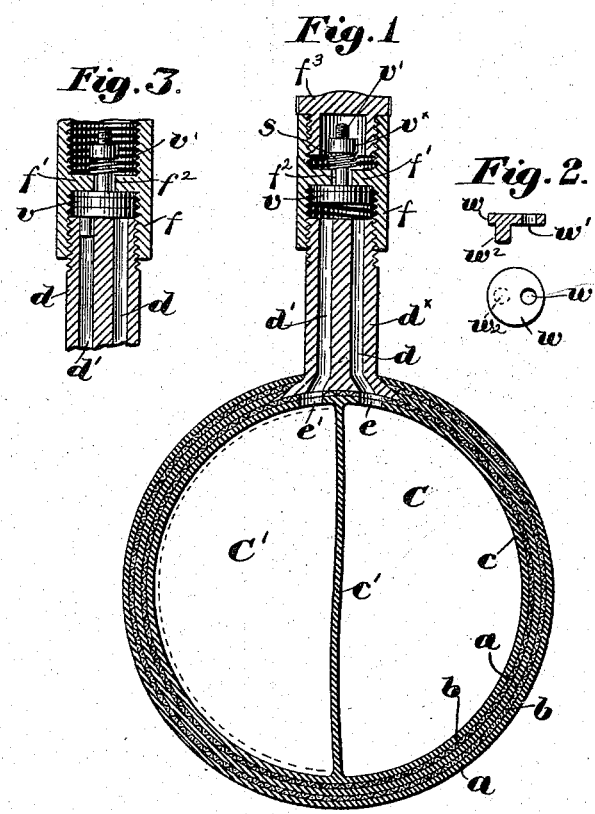
Witnesses:
Walter E. Lombard
Thomas F. Drummond
Inventor:
Warren Ethington Collins,
by Crosby & Gregory
Attys.

UNITED STATES PATENT OFFICE.

WARREN E. COLLINS, OF BOSTON, MASSACHUSETTS.

VALVE FOR PNEUMATIC TIRES.

SPECIFICATION forming part of Letters Patent No. 573,392, dated December 15, 1896.

Application filed July 27, 1896. Serial No. 600,637. (No model.)

*To all whom it may concern:*

Be it known that I, WARREN E. COLLINS, of Boston, county of Suffolk, State of Massachusetts, have invented an Improvement in Pneumatic Tires, of which the following description, in connection with the accompanying drawings, is a specification, like letters on the drawings representing like parts.

This invention relates to pneumatic tires for bicycles or other vehicles, and more particularly to valves for cellular tires wherein the interior is divided by a diaphragm into a plurality of compartments. In the construction of such tires heretofore it has been customary to connect the valve-ports with the different compartments by ducts or pipes secured to or formed in the material of the tire, but such construction is objectionable on account of cost of manufacture, liability to get out of order, and difficulty of repair.

My present invention has for its object the production of a pneumatic tire the compartments of which are connected directly with the valve ports or passages. Means are provided for easily and completely shutting off one compartment from the other in case of a puncture, and the valve is so constructed that when closed communication between the compartments of the tire is completely shut off, while the valve is rendered doubly tight by a simple device.

Figure 1 is a transverse sectional view of a tire and valve embodying my invention, the valve proper, however, being lifted off its seat. Fig. 2 is a plan and sectional view of a removable emergency device for cutting off one compartment of the tire during inflation of the other; and Fig. 3 is a sectional view of the upper end of the valve-case and valve, the latter being seated, and also showing the emergency device in operative position.

Referring to Fig. 1, the tire is shown as composed of alternate layers of rubber $a$ and canvas or other textile material $b$ and with an inner tube or tubular layer $c$. This tube is herein shown as divided by a flexible diaphragm $c'$ into two like annular compartments C and C', the diaphragm being in the central plane of the tire or at right angles to the tread.

The valve-case is composed of a nipple $d^\times$, having two ducts or ports $d$ and $d'$ therein located on opposite sides of the diaphragm $c'$, the inner ends of the ports communicating directly with the compartments C and C' by holes $e$ and $e'$ in the tube $c$ and the adjacent layers of material, if necessary. By this construction no tubular passages or ducts in or secured to the material of the tire are necessary and the construction is greatly simplified and cheapened. The outer end of the nipple is threaded to engage a threaded sleeve $f$, having a transverse diaphragm or auxiliary valve-seat $f'$ to bear upon the top of the valve $v$ when the latter is seated, as shown in Fig. 3, the outer end of the nipple forming the main valve-seat. The valve-stem $v'$ passes loosely through an air-inlet opening $f^2$ in the seat $f'$, a spring $s$ being interposed between the seat and a nut $v^\times$, adjustable on the outer end of the stem. The spring is strong enough to normally hold the valve up against the guide-seat $f'$, except when inflating the tire.

A suitable cap $f^3$ screws into the outer end of the sleeve $f$, closing the same, and after the tire is inflated the sleeve is screwed onto the nipple until the valve is tightly held between the main and auxiliary seats, serving as a double check against leakage, the closure of the ports $d$ and $d'$ at the same time effectually cutting off communication between the compartments C and C'.

Should one of the compartments, as C', be punctured, the air-pressure in the other would instantly press the diaphragm $c'$ into dotted-line position, closing the puncture and preventing total collapse of the tire, which latter is very dangerous when the vehicle is moving at any speed. In event of such puncture I have provided an emergency cut-off which is applied to the valve-seat, closing the port communicating with the punctured compartment and leaving the other port open. The device is shown in Figs. 2 and 3 as a washer $w$, preferably of rubber, of a shape and size to readily enter within the sleeve $f$ and rest upon the end of the nipple $d^\times$, the washer having an opening $w'$ to register with one valve-port, and a lug or nipple $w^2$ on its under side to enter the other valve-port. When in place on the valve-seat, the device prevents the passage of air to one port, as $d'$, Fig. 3, while leaving an unobstructed opening to the port $d$. The rider can then inflate the tire as if it were an ordinary tire and continue his journey without repairing the puncture at the time.

Having fully described my invention, what I claim, and desire to secure by Letters Patent, is—

1. A valve for pneumatic tires, comprising a nipple having two ports extending therethrough, and a main valve-seat, a sleeve threaded onto the nipple and having an auxiliary valve-seat, a valve between it and the main seat, and a spring on the exterior of the auxiliary seat to normally retain the valve against its under side, substantially as described.

2. A valve comprising a nipple having a valve-seat and two ports leading therefrom, a valve proper, a detachable valve-controlling sleeve adjustable on the nipple and in which the valve is movable, and a cut-off adapted to be inserted between the valve and valve-seat, to close one of the ports, substantially as described.

3. A removable cut-off device for valves provided with two inlet-ports, consisting of a disk adapted to rest on the valve-seat and having an opening to register with one port, and a lug or projection on the under side of the disk to enter the other port, substantially as described.

4. A valve for pneumatic tires, comprising a nipple having a port therein and forming the main valve-seat, a valve-controller adjustable on the nipple and provided with an auxiliary seat, a valve proper located between the seat, a valve-stem therefor extended through the auxiliary seat, and an adjustable spring on the exterior of the seat, to normally retain the valve against its inner face, substantially as described.

In testimony whereof I have signed my name to this specification in the presence of two subscribing witnesses.

WARREN E. COLLINS.

Witnesses:
JOHN C. EDWARDS,
AUGUSTA E. DEAN.